(12) United States Patent
Inuzuka

(10) Patent No.: US 7,077,874 B2
(45) Date of Patent: Jul. 18, 2006

(54) INK FOR DYEING A PLASTIC LENS AND METHOD OF DYEING A PLASTIC LENS USING THE INK

(75) Inventor: Minoru Inuzuka, Aichi (JP)

(73) Assignee: Nidek Co., Ltd., Gamagori (JP)

( * ) Notice: Subject to any disclaimer, the term of this patent is extended or adjusted under 35 U.S.C. 154(b) by 74 days.

(21) Appl. No.: 10/467,806

(22) PCT Filed: Mar. 6, 2002

(86) PCT No.: PCT/JP02/02053

§ 371 (c)(1),
(2), (4) Date: Aug. 12, 2003

(87) PCT Pub. No.: WO02/071108

PCT Pub. Date: Sep. 12, 2002

(65) Prior Publication Data

US 2004/0075724 A1   Apr. 22, 2004

(30) Foreign Application Priority Data

Mar. 6, 2001   (JP) ............................. 2001-061765
Dec. 17, 2001   (JP) ............................. 2001-383814

(51) Int. Cl.
*D06P 5/00* (2006.01)

(52) U.S. Cl. ............................. 8/471; 8/506; 106/31.27

(58) Field of Classification Search .................... 8/471, 8/506; 106/31.27
See application file for complete search history.

(56) References Cited

U.S. PATENT DOCUMENTS

| 5,008,239 A | * | 4/1991 | Donenfeld et al. | ......... 503/227 |
| 5,298,031 A | * | 3/1994 | Gabay et al. | .................. 8/471 |
| 5,580,410 A | * | 12/1996 | Johnston | ..................... 156/240 |
| 5,746,816 A | * | 5/1998 | Xu | ........................... 106/31.25 |
| 6,036,307 A | * | 3/2000 | Hakamada et al. | ......... 347/106 |
| 6,536,893 B1 | * | 3/2003 | Kowalski | .................... 347/102 |

FOREIGN PATENT DOCUMENTS

| EP | 0 122 771 A | | 10/1984 |
| EP | 0982432 | * | 3/2000 |
| GB | 1400892 | | 7/1975 |
| JP | A 8-112566 | | 5/1996 |
| JP | A 10-298476 | | 11/1998 |
| JP | A 11-131000 | | 5/1999 |
| JP | A 11-293164 | | 10/1999 |
| JP | A 2000-336582 | | 12/2000 |

* cited by examiner

*Primary Examiner*—Margaret Einsmann
(74) *Attorney, Agent, or Firm*—Oliff & Berridge, PLC

(57) ABSTRACT

The purpose of the present invention is to provide an ink for dyeing a plastic lens, capable of favorably dyeing the plastic lens by a vapor transfer dyeing method, and a method of dyeing a plastic lens by using the ink. In the present invention, an ink for dyeing a plastic lens, the ink being applied by an ink jet printer, sublimated in vacuum and deposited on the plastic lens to dye the lens, wherein the ink includes at least one sublimatable disperse dye of an anthraquinone dye, a quinophthalone dye, and an azo dye of thiazole type.

3 Claims, 2 Drawing Sheets

INK FOR DYEING A PLASTIC LENS AND METHOD OF DYEING A PLASTIC LENS USING THE INK

TECHNICAL FIELD

The present invention relates to an ink for dyeing a plastic lens and a method of dyeing a plastic lens using the ink.

BACKGROUND ART

As a method of dyeing a plastic lens, a method of immersing a lens in a dyeing liquid (solution) for a predetermined time (dip dyeing method) has been known. However, this method involves problems such as poor working circumstance and difficulty for the dyeing of a lens at high refractive index. In view of the above, the present applicant has already proposed a dyeing method of applying (outputting) a sublimatable dye to paper (base body) by an ink jet printer and placing the same in vacuum in noncontact with a lens as disclosed in Japanese Patent unexamined publication No. 2001-59950 (hereinafter referred to as a vapor-deposition transfer dyeing method).

In this vapor-deposition transfer dyeing method, existent inks for ink jet printers or inks used for general textile dyeing involve problems that the heat resistance and sublimation property of dyes are poor and dyeing by the use of such inks causes uneven dyeing or poor coloration to the lens after dyeing.

The present invention has been made in view of the above circumstances and has an object to provide an ink for dyeing a plastic lens capable of appropriately dyeing a plastic lens by the vapor-deposition transfer dyeing method, and a method of dyeing a plastic lens by using the ink.

DISCLOSURE OF THE INVENTION

For solving the foregoing object, the present invention has the following constructions.

(1) An ink for dyeing a plastic lens, the ink being to be applied to a base body by an ink jet printer, and sublimated in vacuum and deposited on the plastic lens to dye the lens, wherein the ink includes at least one sublimatable disperse dye of an anthraquinone dye, a quinophthalone dye, and an azo dye of thiazole type.

(2) The ink for dyeing a plastic lens in (1), further including a dispersant for dispersing the dye in an aqueous system.

(3) The ink for dyeing a plastic lens in (2), further including a humectant used for keeping the ink moistened and a hydrophilic polymeric material for preventing sublimation of the humectant.

(4) The ink for dyeing a plastic lens in (1), wherein a compounding ratio of the dye is in a range of 2.0% by weight to 20.0% by weight.

(5) The ink for dyeing a plastic lens in (1), wherein a particle diameter of the dye is 1 µm or less.

(6) A plastic lens dyeing method of dyeing a plastic lens by sublimating a plastic lens dyeing ink in vacuum and depositing the ink on the lens, including: a step of forming a print area by applying the ink to a base body by an ink jet printer, the ink including at least one sublimatable disperse dye of an anthraquinone dye, a quinophthalone dye, and an azo dye of thiazole type; a step of placing the thus formed print area and the lens to face each other in noncontact relation; and a step of heating at least the print area to sublimate and deposit the dye on the lens.

(7) The plastic lens dyeing method in (6), further including a step of heating the lens on which the dye has been deposited, at a predetermined temperature.

(8) The plastic lens dyeing method in (6), wherein the ink includes a humectant used for keeping the ink moistened and a hydrophilic polymeric material for preventing sublimation of the humectant.

(9) The plastic lens dyeing method in (6), wherein the ink includes a humectant used for keeping the ink moistened and a surface of the base body to be applied with the ink is previously coated with a hydrophilic polymeric material.

BEST MODE FOR PRACTICING THE INVENTION

Figure 1:
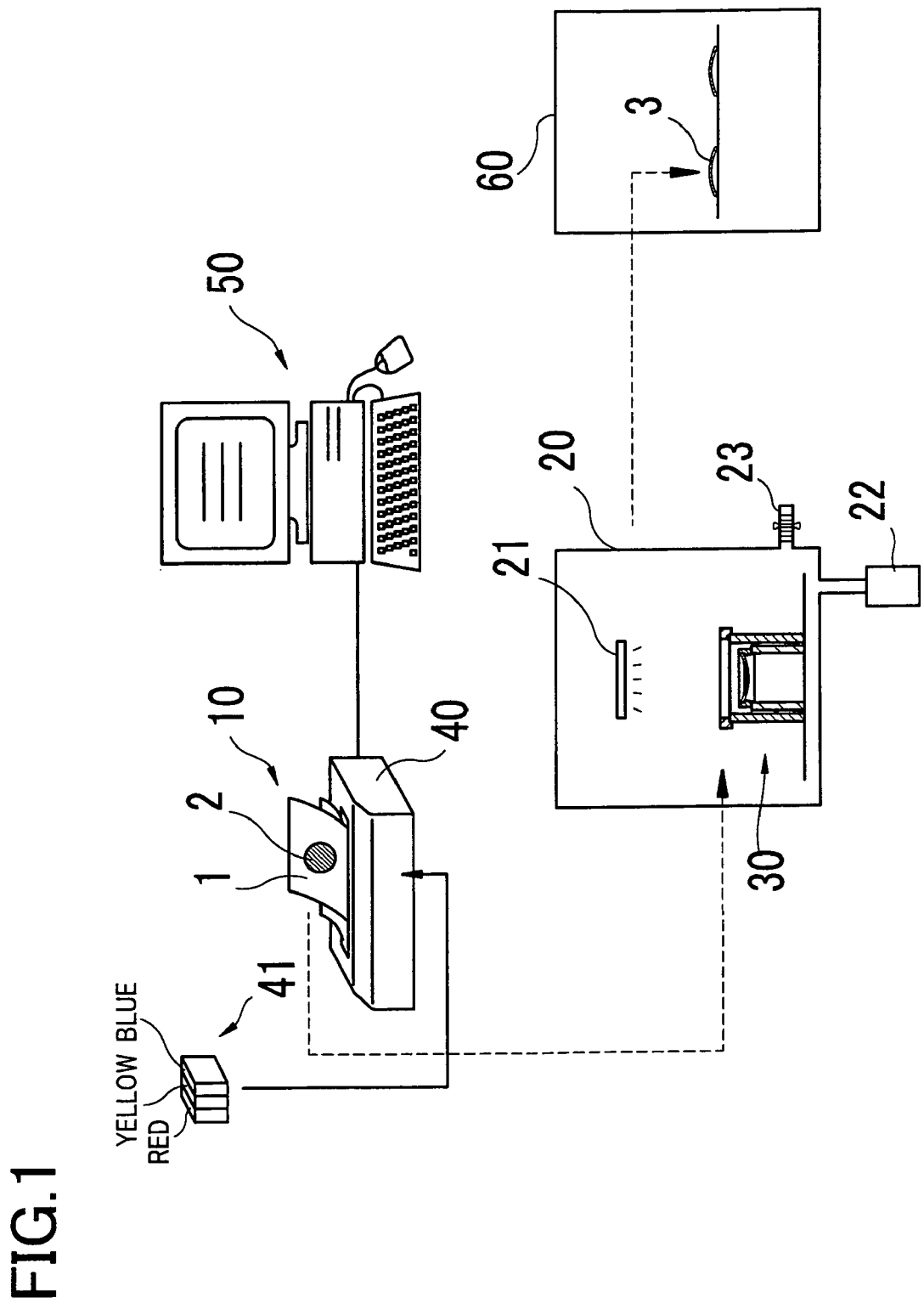
FIG. 1 is a schematic view showing the flow of a vapor deposition transfer dyeing method.

Now, an embodiment of the present invention is to be described with reference to the drawings. FIG. 1 is a schematic view showing the flow of a vapor deposition transfer dyeing method.

(1) Ink Preparation

At first, a dyeing ink used in an ink jet printer is prepared. In this embodiment, dyes for three colors of YELLOW, RED and BLUE (material for dyeing) are used to prepare dyeing inks of three colors of YELLOW, RED and BLUE. Any dye having a sublimation property can be used and hydrophobic disperse dyes are used preferably. Further, in this embodiment, since the dye is sublimated by heating the dye at a predetermined temperature, it is necessary to use a dye capable of resisting the heat during sublimation.

Taking the foregoings into consideration, an anthraquinone disperse dye represented by the following formula (1) or quinophthalone disperse dye represented by the following formula (2) is used preferably as the YELLOW dye.

[Chemical formula 1]

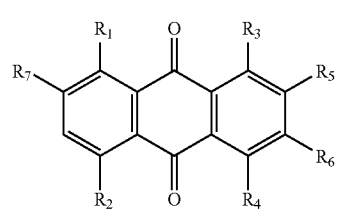

where R1, R2 each represents hydrogen, an alkyl group of 1 to 3 carbon atoms, an amino group or imino group. R3, R4 each represents hydrogen, a halogen group, an alkyl group of 1 to 3 carbon atoms, a hydroxy group, an amino group or imino group. R5, R6 each represents hydrogen, an alkyl group of 1 to 3 carbon atoms, sulfonate group, amino group, imino group, halogen group or ether group (having a structural formula —O—R, in which R represents, for example, an alkyl group of 1 to 10 carbon atoms, a phenyl alkyl group of 1 to 10 carbon atoms or a phenyl group). R7 represents hydrogen or a sulfonate group.

[Chemical formula 2]

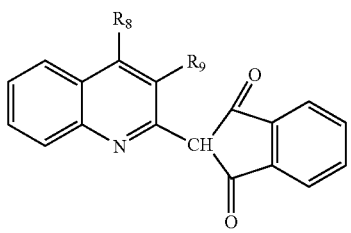

where R8, R9 each represents hydrogen, a hydroxyl group, a halogen group or an alkyl group of 1 to 3 carbon atoms.

Specifically, color ID number (C. I. Disperse, hereinafter referred to as C.I. number) YELLOW 13, YELLOW 51, YELLOW 51, or YELLOW 64 can be used suitably.

Further, an anthraquinone disperse dye represented by the formula (1) or an azo disperse dye of thiazole type represented by the following formula (3) is used preferably as the RED dye.

[Chemical formula 3]

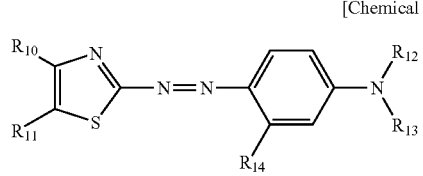

where R10, R11 each represents hydrogen, an alkyl group of 1 to 3 carbon atoms, an alkenyl group of 1 to 3 carbon atoms or an ether group (having a structural formula: —O—R in which R represents, for example, an alkyl group of 1 to 10 carbon atoms, a phenyl alkyl group of 1 to 10 carbon atoms, or a phenyl group). R12, R13 each represents an alkyl group of 1 to 3 carbon atoms, alcohols of 1 to 3 carbon atoms, carboxylic acid of 1 to 3 carbon atoms or esters thereof. R14 represents hydrogen, an alkyl group of 1 to 3 carbon atoms or an imino group.

Specifically, C.I. Numbers RED 4, RED 11, RED 15, RED 55, RED 58, RED 60, RED 86, RED 91, RED 92, RED 127, RED 152, RED 189, RED 229 or RED 302 is used preferably.

Further, an anthraquinone disperse dye represented by the formula (1) or an azo disperse dye of thiazole type represented by the formula (3) is used preferably as the BLUE dye.

Specifically, C.I. Numbers BLUE 56, or BLUE 73 can be used suitably.

The average particle diameter of the dye is, preferably, from 0.05 μm to 1 μm and the maximum particle diameter is 3 μm or less, further preferably, 0.05 μm to 0.5 μm and the maximum particle diameter is 1 μm or less. If the particle diameter of the dye is greater than that described above, clogging may possibly be caused upon discharging the ink from the ink jet printer.

The inks of three colors of YELLOW, RED and BLUE are individually prepared. The dyes for respective colors are put in separate vessels, a dispersant and pure water (or ion exchanged water) are added to each vessel and agitated sufficiently.

The ratio of the dye in the ink prescription or formulation is, preferably, from 0.1% by weight to 20.0% by weight, more preferably, 1.0% by weight to 20.0% by weight and, further preferably, 2.0% by weight to 20.0% by weight. If the dye is less than 0.1% by weight, a desired color density can not be often obtained. Further, if the dye exceeds 20.0% by weight, the dispersibility of the dye becomes poor.

Further, it is preferred that the dispersant used is not thermally decomposed and has a heat resistance but those decomposed by heat may also be used so long as they give no undesired defect on the dyeing.

Each of the vessels in which the dye and the dispersant are sufficiently agitated is placed in a container containing cooling water and treated by a bead mill for a specified period of time to finely disperse the particles of the dye. Then, each liquid (solution) is filtrated under suction through a filter of a pore size of about 1 μm (glass fiber filter paper GF/B) to remove particles of larger size and dusts. Subsequently, pure water or ion exchange water is added for regulation to attain a specified ink density, to complete ink preparation.

(2) Production of a Print Base Body

The inks of three colors prepared as described above are contained in commercially available ink cartridges 41 for the ink jet printer and they are mounted to the ink jet printer 40. A commercially available printer may be used as the printer 40.

Then, for printing desired colors by the printer 40, hue and density thereof are controlled by using a commercial personal computer (hereinafter referred to as PC) 50. Since the control for the hue is conducted by a drawing software of the PC 50, data on the desired hue can be stored in the PC 50 and printing can be conducted repeatedly with an identical hue as required. Further, since the density of the hue is also digitally controlled, printing can be made repeatedly at the same density as required.

Commercial A4 size paper 1 is used as a base body on which the ink (sublimatable dye) is printed. The paper 1 is not limited to paper and there is no restriction so long as it is printable by the printer 40. Since it is heated in the vapor deposition transfer dyeing, it is preferable to use paper or the like having one or both black-colored faces for the purpose of enhancing the efficiency of heat absorption.

The paper 1 is set in the printer 40, and printing is conducted on the paper 1 at a predetermined hue and density by operating the PC 50. An ink-applied print area (colored layer) 2 is printed in a circular form on the paper 1. It is preferable that the print area has a diameter somewhat larger than the diameter of a lens to be dyed. The paper 1 formed with the print area 2 is used as a print base body 10.

(3) Dyeing of a Plastic Lens

Figure 2:
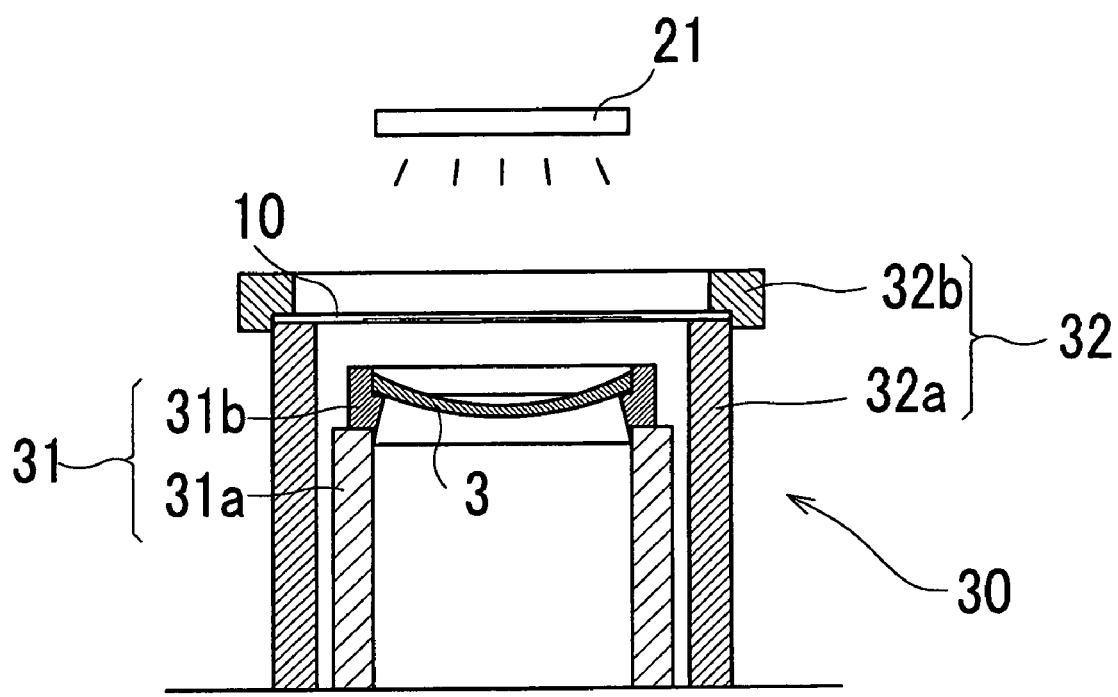
FIG. 2 is a schematic structural view of a dyeing jig.

Next, explanation is made on a method of dyeing a plastic lens 3 by locating the print base body 10 and the lens 3 in a vacuum vapor deposition transfer device 20. FIG. 2 is a schematic structural view (cross sectional view) of a dyeing jig 30.

As the material for the plastic lens 3 to be dyed, usual materials used for spectacle lenses are used including, for example, a polycarbonate resin (e.g., diethylene glycol bis-allyl carbonate polymer (CR-39)), a polyurethane resin, an allyl resin (e.g., allyl diglycol carbonate and its copolymer, and diallyl phthalate and its copolymer), a fumaric acid resin (e.g., benzyl fumarate copolymer), a styrene resin, a polymethyl acrylate resin, a fiber resin (e.g., cellulose propionate), etc.

The transfer device 20 is provided, at the front, with a take-out port not shown for taking in and out the lens 3 and the print base body 10. Numeral 21 is a halogen lamp for heating to sublimate a dye in the print area 2. Numeral 22 is a rotary pump which is used to produce almost a vacuum in the transfer device 20. Numeral 23 is a leak valve which is opened to introduce outside air into the substantially evacuated transfer device 20 to recover the atmospheric pressure.

Numeral 30 denotes a dyeing jig for placing the lens 3 and the print base body 10 in the transfer device 20. The jig 30 includes a lens placing part 31 for placing the lens 3 and a base body placing part 32 for placing the print base body 10.

The lens placing part 31 includes a cylindrical support 31a for supporting the lens 3 at a predetermined height and a cylindrical holder 31b for holding the lens 3. The lens 3 can be placed at a predetermined height when the holder 31b holding the lens 3 on a convex surface side thereof is put on the support 31a as shown in FIG. 2.

A base body placing part 32 includes a cylindrical support 32a for supporting the print base body 10 and a cylindrical retainer 32b for retaining the print base body 10 from above. As shown in FIG. 2, the support 32a is located such that the lens placing part 31 is positioned inside the support 32a. The print base body 10 put on the support 32a is securely fixed and held between the retainer 32b and the support 32a. In this state, the print area 2 of the print base body 10 faces to the lens 3 side (a lower side) in noncontact with the lens 3.

Using the transfer device 20 having the structure described above, the lens 3 is dyed by the following operations.

After setting the lens 3 and the print base body 10 in the jig 30, the transfer device 20 is sealed and the pump 22 is operated to produce almost a vacuum in the device 20. The vacuum in this case is such a state depressurized to about 0.1 kPa to 5 kPa. It may be below 0.1 kPa, but it will require a high-powered exhauster. On the other hand, the higher the pressure in the device 20, the higher the temperature needed for sublimation of the dye. Therefore, the upper limit of the pressure is preferably set at 5 kPa and, more preferably, from 0.1 kPa to 3 kPa.

When a predetermined vacuum degree is reached in the transfer device 20, the lamp 21 is turned on to heat the print base body 10 from above. It is preferable to set the heating temperature on the print base body 10 at a temperature as high as possible within a range not causing denaturation of the dye or deformation of the lens 3.

The heating temperature is made as high as possible in sublimation, because the heating time for color development to a desired hue and density can be shortened to improve the productivity.

When the print base body 10 is heated by turn-on of the lamp. 21, the dye is sublimated and evaporated from the print area 2 and deposited on the lens 3 on the concave surface side. The print base body 10 is heated till almost of the dye of the print base body 2 is sublimated and evaporated.

When the heating is completed, the lamp 21 is turned off and the valve 22 is opened to recover the normal pressure in the transfer device 20, and the lens 3 is taken out. Although the dye has been vapor-deposited on the lens 3, it is liable to come off in this state. Thus, the lens 3 is put in an oven 60 and heated to fix the dye under normal pressures.

The step (coloring step) is executed in the sequence of heating the inside of the oven 60, and then taking out the lens 3 from the oven 60 after a lapse of a predetermined time for obtaining a desired hue and density. The heating temperature in the oven 60 is desirably as high as possible within a range not causing denaturation of the dye and deformation of the lens 3. For example, the heating temperature is from 50° C. to 150° C. and the heating time is from 30 min. to 1 hour.

In the present embodiment, a disperse dye having a hydrophobic property and also a sublimating property is used for the dyeing ink, and a humectant and a controlling agent for preventing clogging of the ink caused by drying or the like in the cartridge of the ink jet printer or controlling the viscosity, the surface tension, etc. of the ink can also be added to the ink.

As the humectant to be used, humectants of polyhydric alcohols are used preferably. Specifically, they can include, for example, ethylene glycol, diethylene glycol, polyethylene glycol, propylene glycol, dipropylene glycol, polypropylene glycol or glycerine. Further, as other humectants, pyrrolidones such as N-methyl-2-pyrrolidone or 2-pyrrolidone, or dimethylsulfoxide or amides such as imidazolidinone may also be used. The humectants described above are liquid moisturizing agents (humectants) and alternatively solid moisturizing agents (humectants), for example, trimethylol methane and pentose may also be used.

In a case of dyeing the lens 3 by adding the humectant for preventing drying of the ink, while clogging due to the drying of the ink can be prevented, the humectant is sublimated and evaporated, and deposited onto the lens 3 together with the dye. When the lens 3 with the humectant is heated (in a color developing step), cohesion of the sublimated dye or the like is caused under the effect of the humectant to bring about unevenness in the dyeing.

Accordingly, in a case of adding the humectant to the ink, a hydrophilic polymeric material is added to the ink for preventing deposition of the humectant on the lens 3 during sublimation of the dye. A hydrophilic polymeric material may previously be applied on the printing surface of the paper 1. The hydrophilic polymeric material to be used is preferably those preventing the sublimation of the humectant and not deteriorating the dispersion stability of the dye, and not deteriorating the dispersion stability of the polymer of a molecular weight of 1,000 or more and 1,000,000 or less, and those polymers of a molecular weight of 1,000 or more and 1,000,000 or less are used preferably.

If the molecular weight is below 1,000, the effect of suppressing the sublimation of the humectant is less provided. On the other hand, if the molecular weight exceeds 1,000,000, the dispersion stability is deteriorated and the ink is less discharged stably from the ink cartridge. The hydrophilic polymeric material used can include natural polymers, semi-synthesis polymers or entirely synthesized polymers.

The natural polymers can include, for example, plant-derived polymers such as gum arabic, tragacanth gum, and guar gum, see weed type polymers such as alginic acid or carrageenan, animal-derived polymers such as gelatin, casein and albumin, or bacteria type polymers such as xanthen gum or dextrane. Further, the semi-synthesis polymers can include, for example, cellulosic polymers such as methyl cellulose, ethyl cellulose, hdyroxyethyl cellulose, and carboxyethyl cellulose, starch series polymers such as sodium starch glycolate, sodium starch phosphate ester, or see weed type polymers such as sodium alginate and propylene glycol ester alginate esters. Further, the entirely synthesized polymers can include, for example, vinylic polymers such as polyvinyl alcohol, polyvinyl pyrrolidone and polyvinyl ethyl ether, or acrylic resins such as non-crosslinked polyacrylamide, polyacrylic acids and alkali metal salts thereof, water soluble styrene and acrylic resins.

Further, the viscosity at a room temperature (25° C.) is preferably 1.1 cps to 3.0 cps, and more preferably, 1.1 cps to 2.0 cps. Further, the surface tension is, preferably, $20 \times 10^{-3}$ N/m to $60 \times 10^{-3}$ N/m and, further preferably, $30 \times 10^{-3}$ N/m to $50 \times 10^{-3}$ N/m.

Concrete examples are shown below.

In Examples 1 to 10 and Comparative Examples 1 to 8, lens dyeing was conducted by the vapor transfer dyeing method using various dyes and the results of dyeing were evaluated.

EXAMPLE 1

In Example 1, a plastic lens of S-2.00 (refractive index 1.74) was used. For the dye, Dianix Yellow F-3GE (Yellow 64) made by DyStar Japan Co., Ltd. was used. Further, Demol MS made by Kao Corporation was used for the dispersing agent. The composition ratio for dye, dispersion agent and pure water was set to 5.0% by weight of dye, 2.5% by weight of dispersant and 92.5% by weight of pure water.

After putting the dye, the dispersion agent and pure water at the composition ratio described above into the vessel, this mixture was agitated for 10 min. or more. Subsequently, the mixture was treated by a beads mill for a specified time (30 min. treatment for about 100 g) to finely granulate the particles of the dye into primary grains. Then, the liquid (solution) was filtrated under suction by a filter of about 1 μm pore size (glass fiber filter paper GF/B) to remove particles of larger particle diameter and dusts. Subsequently, an appropriate amount of pure water was added and the density was adjusted to prepare an ink. When the average particle diameter of the dye was measured by the particle diameter distribution measuring apparatus (SALD-2000, Shimadzu Corporation), the average particle diameter was 0.3 μm.

The prepared ink (YELLOW) was injected into an ink jet printer (RJ-1300V2, Mutoh Industries Ltd.) and commercial paper (gloss paper (black)) made by Mitsubishi Paper Mills Limited) was used to produce a print base body. The print base body was produced such that a circular print area of Φ95 in diameter was formed on a paper (base body) by using a software (Microsoft Word) in the PC and a printing control software. Further, printing was conducted while controlling the ink discharge amount to 50%. The ink was discharged with no clogging from the printer 40.

The print base body was dried and the transfer dyeing operation from the print base body to the lens was conducted by using the transfer device, the jig, and the like. The vacuum degree in the transfer device was 1 kPa and the temperature on the print base body was 250° C. in this case. After the transfer dyeing operation to the lens, the lens was put in the oven for fixing the dye and heated at 140° C. for 2 hours to complete the color developing operation.

The dyed lens after the completion of the color developing operation was evaluated for the hue, the color developing property, the sublimation property and the presence or absence of unevenness.

Hue evaluation: The hue was evaluated as "○" in a case where the chromaticness (chroma saturation) was high and colored in a single color and as "X" in a case where the hue was a mixed color.

Color development evaluation: After color development, the lens was wiped with an acetone-immersed cloth and evaluated as "○" in a case where the dye was not peeled, as "Δ" in a case where it was slightly peeled, and as "X" in a case where it was peeled greatly.

Sublimation evaluation: It was evaluated as "○" in a case where the dye did not remain on the base body after transfer, as "Δ" in a case where it remained slightly, and as "X" in a case where it remained to such an extent as showing no substantial difference with that upon printing.

Presence or absence of unevenness: It was evaluated as "○" in a case where the lens was uniformly dyed and as "X" in a case where it was dyed unevenly.

Table 1 shows the results of the evaluations as described above.

EXAMPLE 2

A plastic lens was dyed by using the same composition, ratio and the dyeing method as those in Example 1 except for using the dye of Palanil Yellow FD-3GE (Yellow 54) made by Mitsui BASF Dye Co. The dyed lens after completion of the color developing operation was evaluated for the hue, the color developing property, the sublimation property and presence or absence of unevenness. Table 1 shows the results of the evaluations.

EXAMPLE 3

A plastic lens was dyed by using the same composition ratio and the dyeing method as those in Example 1 except for using the dye of Sumikaron UL Yellow 4GF (Yellow 51) made by Sumitomo Chemical Co., Ltd. The dyed lens after completion of the color developing operation was evaluated for the hue, the color developing property, the sublimation property and presence or absence of unevenness. Table 1 shows the results of the evaluations.

EXAMPLE 4

A plastic lens was dyed by using the same composition ratio and the dyeing method as those in Example 1 except for using the dye of Kayaron AQ-LE (Kayaron Microester AQ-LE) made by Nippon Kayaku Co., Ltd. The dyed lens after completion of the color developing operation was evaluated for the hue, the color developing property, the sublimation property and presence or absence of unevenness. Table 1 shows the results of the evaluations.

EXAMPLE 5

A plastic lens was dyed by using the same composition ratio and the dyeing method as those in Example 1 except for using the dye of Terasil Pink 3G (Red 302) made by Ciba Specialty Chemicals K.K. The dyed lens after completion of the color developing operation was evaluated for the hue, the color developing property, the sublimation property and presence or absence of unevenness. Table 1 shows the results of the evaluations.

EXAMPLE 6

A plastic lens was dyed by using the same composition ratio and the dyeing method as those in Example 1 except for using the dye of Palanil Red C-BEL (Red 92) made by Mitsui BASF Dye Co. The dyed lens after completion of the color developing operation was evaluated for the hue, the color developing property, the sublimation property and presence or absence of unevenness. Table 1 shows the results of the evaluations.

EXAMPLE 7

A plastic lens was dyed by using the same composition ratio and the dyeing method as those in Example 1 except for using the dye of Sumikaron Red E-FBL (Red 60) made by Sumitomo Chemical Co., Ltd. The dyed lens after completion of the color developing operation was evaluated for the hue, the color developing property, the sublimation property and presence or absence of unevenness. Table 1 shows the results of the evaluations.

EXAMPLE 8

A plastic lens was dyed by using the same composition ratio and the dyeing method as those in Example 1 except for using the dye of Kayaron Light Red B-S (BS-200 (Red 152)) made by Nippon Kayaku Co., Ltd. The dyed lens after completion of the color developing operation was evaluated for the hue, the color developing property, the sublimation property and presence or absence of unevenness. Table 1 shows the results of the evaluations.

EXAMPLE 9

A plastic lens was dyed by using the same composition ratio and the dyeing method as those in Example 1 except for using the dye of Sumikaron Blue E-FBL (Blue 56) made by Sumitomo Chemical Co., Ltd. The dyed lens after completion of the color developing operation was evaluated for the hue, the color developing property, the sublimation property and presence or absence of unevenness. Table 1 shows the results of the evaluations.

EXAMPLE 10

A plastic lens was dyed by using the same composition ratio and the dyeing method as those in Example 1 except for using the dye of Sumikaron Blue S-BG (Blue 73) made by Sumitomo Chemical Co., Ltd. The dyed lens after completion of the color developing operation was evaluated for the hue, the color developing property, the sublimation property and presence or absence of unevenness. Table 1 shows the results of the evaluations.

EXAMPLE 11

A plastic lens was dyed by using the same composition ratio and the dyeing method as those in Example 1 except for using the dye of Dianix Blue AC-E (a main component; anthraquinone dye) made by DyStar Japan Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 1

A plastic lens was dyed by using the same composition ratio and the dyeing method as those in Example 1 except for using the dye of Dianix Brilliant Yellow 5G-E (Yellow 71) made by DyStar Japan Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 2

A plastic lens was dyed by using the same composition ratio and the dyeing method as those in Example 1 except for using the dye of Dianix Yellow AM-42 (Yellow 42) made by DyStar Japan Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 3

A plastic lens was dyed by using the same composition ratio and the dyeing method as those in Example 1 except for using the dye of Terasil Yellow 4G (Yellow 211) made by Ciba Specialty Chemicals K.K. The dyed lens after completion of the color developing operation was evaluated for the hue, the color developing property, the sublimation property and presence or absence of unevenness. Table 1 shows the results of the evaluations.

COMPARATIVE EXAMPLE 4

A plastic lens was dyed by using the same composition ratio and the dyeing method as those in Example 1 except for using the dye of Sumikaron Rubine SE-GL (Red 73) made by Sumitomo Chemical Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 5

A plastic lens was dyed by using the same composition ratio and the dyeing method as those in Example 1 except for using the dye of Dianix Red KB-SE made by DyStar Japan Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 6

A plastic lens was dyed by using the same composition ratio and the dyeing method as those in Example 1 except for using the dye of Dianix Red S-4G made by DyStar Japan Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 7

A plastic lens was dyed by using the same composition ratio and the dyeing method as those in Example 1 except for using the dye of Kayalon Polyester Red TL-SF (Red 323) made by Nippon Kayaku Co., Ltd. The dyed lens after completion of the color developing operation was evaluated for the hue, the color developing property, the sublimation property and presence or absence of unevenness. Table 1 shows the results of the evaluations.

COMPARATIVE EXAMPLE 8

A plastic lens was dyed by using the same composition ratio and the dyeing method as those in Example 1 except for using the dye of Dianix Navy Blue BG-SE200 made by DyStar Japan. Co., Ltd. The dyed lens after completion of the color developing operation was evaluated for the hue, the color developing property, the sublimation property and presence or absence of unevenness. Table 1 shows the results of the evaluations.

TABLE 1

| Color | | Manufacturer | Product Name | C.I No. | Remarks | Hue | Color development | Un-evenness | Sub-limation | Comprehensive evaluation |
|---|---|---|---|---|---|---|---|---|---|---|
| Yellow | Ex. 1 | Dystar Japan | Dianix Yellow F-3GE | Yellow64 | quinophthalone dye | | ○ | ○ | ○ | ○ |
| | Ex. 2 | Mitsui BASF Dye | Palanil Yellow FD-3GE | Yellow54 | quinophthalone dye | | ○ | ○ | ○ | ○ |
| | Ex. 3 | Sumitomo Chemical | Sumikaron UL Yellow 4GF | Yellow51 | anthraquinone dye | | ○ | 0 | ○ | ○ |
| | Ex. 4 | Nippon Kayaku | Kayaron AQ-LE | — | quinophthalone dye | | ○ | 0 | ○ | ○ |
| | C. Ex. 1 | Dystar Japan | Dianix Brilliant Yellow 5G-E | Yellow71 | naphthalimido dye | | x | ○ | ○ | x |
| | C. Ex. 2 | Dystar Japan | Dianix Yellow AM-42 | Yellow42 | nitro dye | | ○ | x | ○ | x |
| | C. Ex. 3 | Chiba Specialty Chemicals | Terasil Yellow 4G | Yellow211 | azo dye | red-tinted | ○ | ○ | ○ | x |
| Red | Ex. 5 | Chiba Specialty Chemicals | Terasil Pink 3G | Red302 | anthraquinone dye | | ○ | ○ | ○ | ○ |
| | Ex. 6 | Mitsui BASF Dye | Palanil Red C-BEL | Red92 | anthraquinone dye | | ○ | ○ | ○ | ○ |
| | Ex. 7 | Sumitomo Chemical | Sumikaron Red E-FBL | Red60 | anthraquinone dye | | ○ | ○ | ○ | ○ |
| | Ex. 8 | Nippon Kayaku | Kayaron Light Red B-S (BS-200) | Red152 | azo dye of thiazole type | | ○ | ○ | ○ | ○ |
| | C. Ex. 4 | Sumitomo Chemical | Red Sumikaron Rubine SE-GL | Red73 | azo dye | | Δ | ○ | ○ | x |
| | C. Ex. 5 | Dystar Japan | Dianix Red KB-SE | — | azo dye | | x | ○ | Δ | x |
| | C. Ex. 6 | Dystar Japan | Dianix Red S-4G | — | azo dye | | Δ | x | ○ | x |
| | C. Ex. 7 | Nippon Kayaku | Kayalon Polyester Red TL-SF | Red323 | azobenzen dye | | x | ○ | Δ | x |
| Blue | Ex. 9 | Sumitomo Chemical | Sumikaron Blue E-FBL | Blue56 | anthraquinone dye | | ○ | ○ | ○ | ○ |
| | Ex. 10 | Sumitomo Chemical | Sumikaron Blue S-BG | Blue73 | anthraquinone dye | | ○ | ○ | ○ | ○ |
| | Ex. 11 | Dystar Japan | Dianix Blue AC-E | — | anthraquinone dye | | ○ | ○ | ○ | ○ |
| | C. Ex. 8 | Dystar Japan | Dianix Navy Blue BG-SE200 | — | azo dye | reddish black | ○ | x | Δ | x |

(C.Ex.: Comparative Example)

<Results>

As shown in Table 1, for the yellow (YELLOW) dyes, good result was obtained by the quinophthalone dye and the anthraquinone dye. The dye used in Comparative Example 3 was favorable in view of the color developing, unevenness, sublimation property but since it resulted in red-tinted hue, it was not suitable to yellow dyeing. Further, for the red (RED) dyes, good result was obtained by the anthraquinone dye and the thiazole type dye and, for the blue (BLUE) dye, good result was obtained by the anthraquinone dye.

Further, the lens of Example 1 (S-2.00, refractive index 1.74) was dyed by the dyeing method using the dyes used in Examples 1 to 9 and Comparative Examples 1 to 8, but the lens was dyed only slightly and could not be dyed in a desired density.

Then, the dyeing density for the lens in a case of variously changing the density of the dye in the ink was evaluated.

<Condition A>

As the dye to be used, Kayaron AQ-LE (YELLOW dye in Example 4), Kayaron Light Red B-S (RED dye in Example 8) and Sumikaron blue E-FBL (BLUE dye in Example 9) were used. Kao Demol MS was used for the dispersant.

The ink prescription (composition ratio) for the condition A was: 1.0% by weight of dye, 0.5% by weight of dispersant and 98.5% by weight of pure water. The ink was prepared by the same procedures as those in Example 1.

A print base body was prepared by an ink jet printer (Super-mechie, made by Intack Corporation). Further, the discharge amount from each of the ink discharge heads for printing on the paper (base body) was at 100% for each color in case of outputting in a single color and at 50% for each color in case of outputting in a mixed color.

The transfer dyeing operations were performed using CR-39 for the plastic lens under the color developing condition of 135° C., for 1 hour, and in the same manner as in Example 1. The chromaticity of the dyed plastic lens (after color development) was measured by using a color measuring device (DOT-3, manufactured by Murakami Color Research Laboratory). Table 2 shows the results thereof.

<Condition B>

The condition was identical with the condition A except for changing the composition ratio of the ink to 2.0% by weight of dye, 1.0% by weight of dispersant and 97.0% by weight of pure water. The chromaticity of the dyed plastic lens (after color development) obtained in the same manner as the condition A was measured by using the color measuring device. Table 2 shows the results thereof.

<Condition C>

The condition was identical with the condition A except for changing the composition ratio of the ink to 5.0% by weight of dye, 2.5% by weight of dispersant and 92.5% by weight of pure water. The chromaticity of the dyed plastic lens (after color development) obtained in the same manner as the condition A was measured by using the color measuring device. Table 2 shows the results thereof.

<Condition D>

The condition was identical with the condition A except for changing the composition ratio of the ink to 10.0% by weight of dye, 5.0% by weight of dispersant and 85.0% by weight of pure water. The chromaticity of the dyed plastic lens (after color development) obtained in the same manner as the condition A was measured by using the color measuring device. Table 2 shows the results thereof.

<Condition E>

The condition was identical with the condition A except for changing the composition ratio of the ink to 20.0% by weight of dye, 10.0% by weight of dispersant and 70.0% by weight of pure water. The chromaticity of the dyed plastic lens (after color development) obtained in the same manner as the condition A was measured by using the color measuring device. Table 2 shows the results thereof.

<Condition F>

The condition was identical with the condition A except for changing the composition ratio of the ink to 30.0% by weight of dye, 15.0% by weight of dispersant and 55.0% by weight of pure water. The viscosity was high and therefore stable printing could not be performed. In addition, cohesion of the dye was also observed.

about 10% of all the products correspondingly dyed by the dip dyeing method.

Under the condition B (dye concentration: 2.0%), the lens could be dyed at about 40% of the dyeing density in the mixed color. In this case, the ink prescription under the condition B can be applied to about 30% of all the products correspondingly dyed by the dip dyeing method.

Under the condition C (dye concentration: 5.0%), the lens could be dyed at about 60% of the dyeing density in the mixed color. In this case, the ink prescription under the condition C can be applied to about 70% of all the products correspondingly dyed by the dip dyeing method.

Under the condition D (dye concentration: 10.0%), the lens could be dyed at about 75% of the dyeing density in the mixed color. In this case, the ink prescription under the condition D can be applied to about 90% of all the products correspondingly dyed by the dip dyeing method.

Under the condition E (dye concentration: 20.0%), the lens could be dyed at about 85% of the dyeing density in the mixed color. In this case, the ink prescription under the condition E can be applied to almost all the products which is correspondingly dyed by the dip dyeing method.

Under the conditions B or C, the dyeing density can be brought to 60% to 70% by repeating the transfer dyeing

TABLE 2

|  | Condition A | Condition B | Condition C | Condition D | Condition E | Condition F |
|---|---|---|---|---|---|---|
| Composition ratio | | | | | | |
| Dye | 1.00% | 2.00% | 5.00% | 10.00% | 20.00% | 30.00% |
| Dispersant | 0.50% | 1.00% | 2.50% | 5.00% | 10.00% | 15.00% |
| Pure water | 98.50% | 97.00% | 92.50% | 85.00% | 70.00% | 55.00% |
| Chromaticity (Red) | | | | | | |
| Y | 70.05 | 54.6 | 35.45 | 25.28 | 17.15 | |
| L* | 87.02 | 78.81 | 66.08 | 57.35 | 48.45 | |
| a* | 17.92 | 38.43 | 62.64 | 75.04 | 78.65 | |
| b* | −2.94 | −6.76 | −6.15 | 1.06 | 7.96 | |
| Chromaticity (Yellow) | | | | | | |
| Y | 92.51 | 91.98 | 90.97 | 89.81 | 82.53 | |
| L* | 97.03 | 96.81 | 96.4 | 95.92 | 92.81 | |
| a* | −1.86 | −4.58 | −9.41 | −14.01 | −16.73 | |
| b* | 8.56 | 11.69 | 25.64 | 42.35 | 58.42 | |
| Chromaticity (Blue) | | | | | | |
| Y | 84.25 | 80.25 | 66.77 | 47.4 | 29.47 | |
| L* | 93.56 | 91.8 | 85.39 | 74.45 | 61.19 | |
| a* | −1.40 | −3.77 | −7.73 | −12.34 | −12.03 | |
| b* | −4.32 | −7.1 | −16.31 | −31.99 | −45.3 | |
| Chromaticity (Mixed color) | | | | | | |
| Y | 76.77 | 56.56 | 39.74 | 19.13 | 11.04 | |
| L* | 90.22 | 79.93 | 69.28 | 50.84 | 39.65 | |
| a* | 8.38 | 15.82 | 28.33 | 43.5 | 46.65 | |
| b* | −0.68 | −1.25 | −2.61 | 0.04 | 2.67 | |
| Dyeing density | about 30% | about 50% | about 65% | about 75% | about 85% | |

<Results>

Under the condition A (dye concentration: 1.0%), the lens could be dyed at about 20% of the dyeing density in the mixed color (50% output for each color). In this case, the ink prescription under the condition A can be applied only to operations twice or three times. However, when the dye concentration is lowered as far as 1.0% (condition A), the dyeing density does not sometimes reach 70% unless the transfer dyeing operation is repeated by 5 to 10 times. Such a method is actually poor in view of the operation performance and is not practical.

Then, in a case of adding the humectant to the ink, the effect thereof on the lens dyeing was evaluated.

EXAMPLE 12

In Example 12, a CR-39 lens was used. The used dyes were Kayaron AQ-LE (YELLOW), Kayaron Light RED B-S (RED), Dianix BLUE AC-E (BLUE). Furthermore, the used dispersant was Demol-MS made by Kao.

Table 3 shows the composition for each ink put in each cartridge.

TABLE 3

|  | RED | YELLOW | BLUE |
| --- | --- | --- | --- |
| Dye | 1.0% | 3.0% | 3.0% |
| Dispersant | 0.5% | 0.5% | 0.5% |
| Pure water | 98.5% | 96.5% | 96.5% |

In this table, "%" means "% by weight".

After putting the dye, the dispersant and pure water in each composition as shown in Table 3 into each vessel, these mixtures were agitated for 10 min. or more. Subsequently, they were treated by an ultrasonic homogenizer for a specified time (30 min. treatment for about 100 g) to finely granulate the particles of the dye into primary particles. Then, each liquid (solution) was filtrated under suction by a filter of about 1 μm pore size (glass fiber filter paper GF/B) to remove particles of larger particle size and dusts. An appropriate amount of pure water was further added for regulation of the density to prepare inks. When the average particle diameter of the dye was measured by the particle diameter distribution measuring apparatus (SALD-2000, manufactured by Shimadzu Corporation), the average particle diameter was 0.3 μm.

Each of the prepared inks was injected into an ink jet printer (RJ-1300V2, manufactured by Mutoh Industries Ltd.) and commercial paper (gloss paper (black) made by Mitsubishi Paper Mills Limited) was used to produce a print base body. The print base body was produced such that a circular print area of Φ95 in diameter was formed on the paper (base body) by using the PC's software (Microsoft Word) and a printing control soft. Further, the hue was set to R150, G100 and B50.

The print base body was dried, and the transfer dyeing operation from the print base body to the lens was conducted by using the transfer device, the jig, and the like described above. The vacuum degree in the transfer device was 1 kPa and the temperature on the print base body was 250° C. in this case. It was confirmed that almost of the dye sublimated from the print area of the print base body and deposited on the lens. After the transfer dyeing operation to the lens, the lens was placed in the oven for fixing the dye and heated at 135° C. for 1 hour to complete the color developing operation.

EXAMPLE 13

In Example 13, inks added with the humectant and the polymeric material were used. The material of the lens, the dye and the dispersant identical with those of Example 12 were used. Glycerin was used for the humectant and methyl cellulose 25 was used for the hydrophilic polymeric material.

Table 4 shows the composition for each ink filled into each ink cartridge.

TABLE 4

|  | RED | YELLOW | BLUE |
| --- | --- | --- | --- |
| Dye | 1.0% | 3.0% | 3.0% |
| Dispersant | 0.5% | 0.5% | 0.5% |
| Pure water | 78.3% | 76.3% | 76.3% |
| Glycerine | 20.0% | 20.0% | 20.0% |
| Methyl cellulose | 0.2% | 0.2% | 0.2% |

In this table, "%" means "% by weight".

After putting the dye, dispersant, pure water, humectant and polymeric material of the compositions as shown in Table 4 into each vessel, each mixture was agitated for 10 min. or more. Then, each mixture was treated for a specified time by the ultrasonic homogenizer (30 min. treatment for about 100 g), filtered under suction through a filter, and pure water was further added by an appropriate amount to regulate the concentration to prepare inks. The average particle diameter was 0.3 μm.

Each prepared ink was injected into each ink cartridge of an ink jet printer (MJ-520C manufactured by EPSON) and the print base body was produced by the same procedures as in Example 12 and the transfer dyeing operation to the lens was conducted.

Since the ink discharge port (head portion) of the ink cartridge was smaller in the printer used in Example 13 compared with the printer used in Example 12, it was worried about the clogging due to the drying of the ink. However, by addition of the humectant to the ink, printing on the paper could be conducted, thus producing the print base body with no clogging due to drying even in a case of using the printer repetitively. After drying the print base body, the transfer dyeing operation and the color developing operation were conducted under the same conditions as those in Example 12.

When the lenses after color development were observed, it was found that the lenses were dyed uniformly with no unevenness in a brownish color at 32.0% of a luminous transmittance (measured at 100 visual field by use of a D65 light source of a color measuring device DOT-3, manufactured by Murakami Color Research Laboratory).

EXAMPLE 14

In Example 14, inks prepared by adding a humectant (glycerine) to each ink in Example 12 were used.

Table 5 shows an ink prescription.

TABLE 5

|  | RED | YELLOW | BLUE |
| --- | --- | --- | --- |
| Dye | 1.0% | 3.0% | 3.0% |
| Dispersant | 0.5% | 0.5% | 0.5% |
| Pure water | 78.5% | 76.5% | 76.5% |
| Glycerine | 20.0% | 20.0% | 20.0% |

The inks were prepared in the same manner as in Example 12 to complete the inks. Further, a polymeric material was coated to the paper used for the print base body (gloss paper (black) made by Mitsubishi Paper Mills Limited) on the side of a surface to be printed. Methyl cellulose 400 was used for the polymeric material, which was dissolved into water as a 10% solution and then coated with no unevenness on the side of the printing surface by a brush, followed by drying.

After setting the paper coated with methyl cellulose in an ink jet printer (MJ-520C, manufactured by EPSON), a print base body was produced by the same procedures as those in Example 12. Printing was conducted with no clogging from the printer to the paper, and the print base body could be produced. After drying the print base body, the transfer dyeing operation and the color developing operation were conducted under the same conditions as those in Example 12.

When the lenses after color development were observed, it was found that the lenses were dyed uniformly with no unevenness in a brownish color at 29.5% of luminous transmittance.

COMPARATIVE EXAMPLE 9

In Comparative Example 9, the polymeric material was not used and a print base body was produced by using the ink in Example 14 (ink prescription in Table 5). The transfer dyeing operation and the color developing operation were conducted with other conditions being identical with those in Example 12. When the lenses after color development were observed, it was found that the lenses were dyed unevenly.

INDUSTRIAL APPLICABILITY

As described above, according to the present invention, the plastic lens can be dyed favorably by the vapor deposition transfer dyeing method.

The invention claimed is:

1. A method of dyeing a plastic lens, comprising:
   applying, selectively or in combination, a first ink comprising a sublimatable disperse yellow dye, a second ink comprising a sublimatable disperse red dye, and a third ink comprising a sublimatable disperse blue dye, to a base body using an ink jet printer to form a print area on the base body;
   placing the base body and the lens so that the print area faces, but does not contact, a surface of the lens to be dyed; and
   heating at least the print area of the base body under a vacuum to sublimate and deposit the dye on the surface of the lens;
   wherein:
   the yellow dye is an anthraquinone dye, or a quinophthalone dye;
   the red dye is an anthraquinone dye or an azo dye of thiazole type;
   the blue dye is an anthraquinone dye; and
   each of the first, second and third inks further comprises
   a dispersant for dispersing the respective dye in an aqueous system,
   a humectant for preventing drying of the respective ink, and
   a hydrophilic polymeric material for preventing sublimation of the respective humectant during sublimation of the respective dye; and
   the respective polymeric materials are selected so as not to deteriorate a dispersion stability of the dye.

2. The method to claim 1, further comprising heating the lens to a predetermined temperature after the dye has been deposited on the lens.

3. A method of dyeing a plastic lens, comprising:
   forming a print area on a base body by coating the base body with a hydrophilic polymeric material;
   applying, selectively or in combination, a first ink comprising a sublimatable disperse yellow dye, a second ink comprising a sublimatable disperse red dye, and a third ink comprising a sublimatable disperse blue dye, to the formed print area of the base body using an ink jet printer;
   placing the base body and the lens so that the print area and a surface of the lens to be dyed face, but do not contact, each other; and
   heating at least the print area under a vacuum to sublimate and deposit the dye on the surface of the lens;
   wherein:
   the yellow dye is an anthraquinone dye or a quinophthalone dye;
   the red dye is an anthraquinone dye or an azo dye of thiazole type;
   the blue dye is an anthraquinone dye; and
   each of the first, second and third inks further comprises a dispersant for dispersing the respective dye in an aqueous system and a humectant for preventing drying of the respective ink.

* * * * *